United States Patent Office 3,030,496
Patented Apr. 17, 1962

3,030,496
WELDING ELECTRODES
George H. Cotter, Monroeville, Pa., and Edward R. Gamberg, Clarence, and Harry J. Bichsel, East Aurora, N.Y., assignors to Westinghouse Electric Corporation, East Pittsburgh, Pa., a corporation of Pennsylvania
No Drawing. Filed Mar. 17, 1959, Ser. No. 799,853
6 Claims. (Cl. 219—145)

This invention relates to the arc-welding art and has particular relationship to arc-welding electrodes which may be used for manual welding but are particularly suitable for welding continuously as in automatic or semiautomatic metals joining.

In its specific aspects this invention concerns itself with so-called bare electrodes which may be distinguished from the wash-coated electrodes such as are disclosed in Ludwig Patent 2,818,496 and particularly such bare electrodes for welding mild steel. In this case, an electrode of mild steel is used and in welding with such a bare electrode made in accordance with the teachings of the prior art, it has been found that the welding arc is erratic and that during the welding operation there is excessive spatter of droplets of metal. In addition, during welding the energy level of the electrode in accordance with the teachings of the prior art is so affected that the transfer of metal is of the globular type rather than of the spray type. As the welding with this electrode proceeds, large globules of the metal build up at the tip of the electrode and drop through the arc when they reach a size at which their weight overcomes the surface tension at the tip.

It is then broadly an object of this invention to provide a bare electrode as distinct from a wash-coated electrode for welding in a shield of inert gas or carbon dioxide in the use of which the arc shall be stable, the spatter shall be minimized and the transfer of metal through the arc shall be of the spray rather than of the globular type.

A study of the causes of the erratic arc action, the spatter and the pressure of globular transfer has led to the conclusion that these difficulties are caused by the presence of materials which are highly electron emissive in the surface of the electrode. Such materials include all alkaline earths and such alkali metals as cesium. It has been discovered in arriving at this invention in its broader aspects that such emissive materials are introduced into the surface of the electrode during the soaking and drawing operations to which the wire which ultimately becomes the electrode, is subjected. In accordance with the teachings of the prior art attempts have been made to produce such electrodes made of wire soaked in lime and subsequently drawn in a lime lubricant. These soaking and drawing processes introduce calcium in the form of an oxide or a hydroxide into the surface. The electron emissive properties of the calcium then causes the erratic arc action, the spatter and the globular arc transfer. Drawing compounds including other alkaline earth metals or cesium would produce similar undesired effects.

In an effort to eliminate the electron emissive material from the surface of the electrode, the wire is subjected to additional treatment after being drawn. The emissive material is removed by thoroughly cleaning the wire after the drawing then the wire is copper flashed. This results in the coating of the wire with a thin copper coating. The appearance of a uniform copper coating on the wire indicates that the wire has been properly cleaned and that substantially all of the emissive material in the drawing compound which might adversely affect the welding, has been removed. The cleaning and copper flashing of the wire in forming it into a welding electrode has the important disadvantage that it is highly costly. The cost of flashing at the present time appears to be as high as 1¾¢ per pound of electrode.

In addition, when this copper flashed electrode is used for welding the weld area has an undesirable brown deposit on it. This deposit is probably a copper compound.

It is then a specific object of this invention to provide a low-cost bare welding electrode in the use of which the arc shall be stable, the spatter shall be minimized and the transfer of metal shall be in the form of a spray of fine particles and the resulting bead shall be free of any brown deposit.

In accordance with this invention, the wire which constitutes the electrode is soaked in a medium and drawn with a lubricant both of which are free of materials which are highly electron emissive. Specifically, the soaking and drawing compounds may be borax, $Na_2B_4O_7$, or aluminum stearate or a like material. This electrode has no coating of copper or any like material.

In its broader aspects, this invention is applicable to electrodes of many types including, for example, stainless steel welding electrodes. In its specific aspects, this invention is applicable to mild steel electrodes used in the welding of iron and steel and in this aspect, the invention is particularly advantageous and is highly important. For example, it has been found that a wire soaked and drawn in borax and having the following composition operates highly satisfactorily.

| | |
|---|---|
| Carbon | .09 to .15%. |
| Manganese | .90 to 1.20%. |
| Silicon | .35 to .50%. |
| Sulphur | .035% maximum. |
| Phosphorus | .03% maximum. |
| Iron | Remainder. |

Many welds have been produced with an electrode consisting of wire of the composition in the above table soaked and drawn in borax and without a copper coating. In welding with this electrode, it was found that the arc is stable, that there is very little spatter and that the transfer is of the spray type. In addition, it was found that there is no brown deposit on the weld area.

Like results were obtained with wire soaked and drawn in borax and having a higher silicon content; for example, a wire having the following composition:

| | |
|---|---|
| Carbon | .09 to .15%. |
| Manganese | .90 to 1.20%. |
| Silicon | .60 to 80%. |
| Sulfur | Approximate maximum .035%. |
| Phosphorous | Approximate maximum .03%. |
| Iron | Remainder. |

This electrode lends itself to high-speed welding.

While preferred embodiments of this invention have been disclosed herein, many modifications thereof are feasible. This invention then is not to be restricted except insofar as is necessitated by the spirit of the prior art.

We claim as our invention:

1. A bare welding electrode particularly for welding with a substantially spatter-free spray deposit in a shield of inert gas, carbon dioxide or the like, said electrode consisting of an uncoated wire treated during its manufacture with soaking and drawing compounds including only materials which have low electron emissivity.

2. A bare welding electrode particularly for welding with a substantially spatter-free spray deposit in a shield of inert gas, carbon dioxide or the like, said electrode consisting of an uncoated wire treated during its manufacture with soaking and drawing compounds comprising one or more of the class consisting of borax and aluminum stearate.

3. A bare welding electrode particularly for welding with a substantially spatter-free spray deposit in a shield of inert gas, carbon dioxide or the like and consisting of an uncoated wire having essentially the following composition:

| | |
|---|---|
| Carbon | .09 to 0.15%. |
| Manganese | .90 to 1.20%. |
| Silicon | .35 to .50%. |
| Sulfur | Not more than .035%. |
| Phosphorous | Not more than .03%. |
| Iron | Remainder. | said wire having been treated during its manufacture with soaking and drawing compounds including only materials which have a low electron emissivity.

4. A bare welding electrode particularly for welding with a substantially spatter-free spray deposit in a shield of inert gas, carbon dioxide or the like and consisting of an uncoated wire having essentially the following composition:

| | |
|---|---|
| Carbon | .09 to 0.15%. |
| Manganese | .90 to 1.20%. |
| Silicon | .35 to .50%. |
| Sulfur | Not more than .035%. |
| Phosphorous | Not more than .03%. |
| Iron | Remainder. | said wire having been treated during its manufacture with soaking and drawing compounds comprising one or more of the class consisting of borax and aluminum stearate.

5. A bare welding electrode particularly for welding with a substantially spatter-free spray deposit in a shield of inert gas, carbon dioxide or the like and consisting of an uncoated wire having essentially the following composition:

| | |
|---|---|
| Carbon | .09 to .15%. |
| Manganese | .90 to 1.20%. |
| Silicon | .60 to .80%. |
| Sulfur | Approximate maximum .035%. |
| Phosphorous | Approximate maximum .03%. |
| Iron | Remainder. | said wire having been treated during its manufacture with soaking and drawing compounds including only materials which have a low electron emissivity.

6. A bare welding electrode particularly for welding with a substantially spatter-free spray deposit in a shield of inert gas, carbon dioxide or the like and consisting of an uncoated wire having essentially the following composition:

| | |
|---|---|
| Carbon | .09 to .15%. |
| Manganese | .90 to 1.20%. |
| Silicon | .60 to .80%. |
| Sulfur | Approximate maximum .035%. |
| Phosphorous | Approximate maximum .03%. |
| Iron | Remainder. | said wire having been treated during its manufacture with soaking and drawing compounds comprising one or more of the class consisting of borax and aluminum stearate.

References Cited in the file of this patent

UNITED STATES PATENTS

| 1,963,298 | Elder | June 19, 1934 |
| 2,413,220 | Elder et al. | Dec. 24, 1946 |
| 2,709,516 | Trembicki | May 31, 1955 |

FOREIGN PATENTS

| 16,463 | Great Britain | 1902 |
| 604,353 | Great Britain | July 2, 1948 |